Sept. 2, 1958     H. C. STOCKFLETH     2,850,059
UNIVERSAL END-TAPER CUTTER FOR ARROW SHAFTS
Filed Aug. 3, 1955
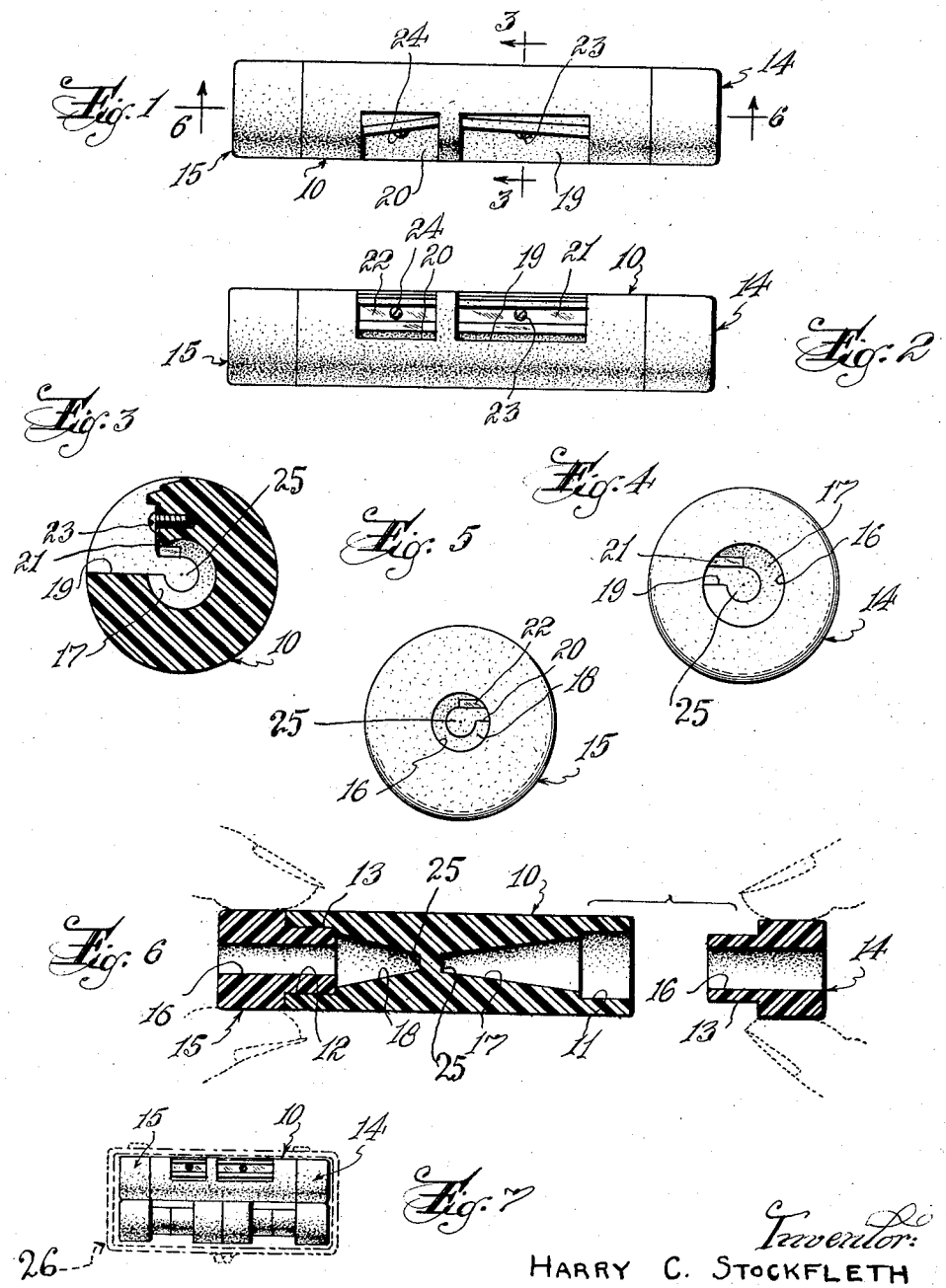
Inventor:
HARRY C. STOCKFLETH

United States Patent Office 2,850,059
Patented Sept. 2, 1958

2,850,059

UNIVERSAL END-TAPER CUTTER FOR ARROW SHAFTS

Harry C. Stockfleth, Chatham, N. J.

Application August 3, 1955, Serial No. 526,255

1 Claim. (Cl. 144—30)

The invention relates in general to wood cutting tools and has particular reference to a special tool for applying a taper cut to the respective foot and nock ends of the wooden shafts of arrows used in archery.

Prior to my present invention, the tools employed to taper the ends of arrow shafts have been designed for power rotation and comprise two separate and distinct units, one for each of the differently tapered shaft ends. Each unit includes an elongated body having at one end a shaft-receiving throat equipped with an internal angularly arranged cutting blade and at its opposite end with an axial shank to fit the chuck of the machine tool used to impart rotation to the body. In operation, each of the two taper cutter units, which have their respective cutting blades arranged at different angles required for the different foot and nock tapers, is interchangeably fitted in the chuck of the machine tool and the corresponding ends of a number of arrow shafts are given the desired angular taper by successive insertion in the throats of the appropriate units.

For reasons of economy and convenience, it is not practicable for the average archer to own a machine tool and have it available wherever needed, especially when on a hunting trip.

It, therefore, is the primary object of my present invention to provide archers with a compact pocket-size taper cutter which combines in a single body the required pair of throats and associated differently angularly arranged cutting blades for applying the required taper cut to either end of an arrow shaft by successive operations with the same hand tool very conveniently at home or in the field. Due to the lack of a machine tool to rotate the taper cutter on a fixed axis, I have provided sufficiently elongated guide-bearing means for location in advance of each throat in the cutter body to insure precise rectilinear feeding of an engaged shaft end to the corresponding cutting blade during relative rotation of said shaft and cutter body.

Because the shafts of arrows for various types of archery, such as target practice, long-range archery competition, hunting, and the like, are produced in different diameters, it is another important object of my invention to provide guide-bearing means of a nature which will insure the proper guiding action for a shaft of any of the standard sizes as the end thereof enters either throat of the cutter body. To be explicit, this object is accomplished by providing a set of guide-bearing bushings having bores of the required range of graduated inside diameters to rotatably fit all of the standard diametrically sized shafts in common use, the construction of each bushing of the set being suited for interchangeable engagement with the cutter body in axial registration with either end thereof, whereby a shaft of any standard size may be given the desired taper at either its foot end or its nock end.

A further object of the invention is to provide a taper cutter which includes means in association with each throat and cutting blade to stop the cutting action when sufficient taper has been applied but before any shortening of the shaft can be caused by continued excessive cutting. This is important, because each matched set of arrows of any particular type must be of precisely the same length.

Other objects, features and advantages of the invention will become apparent as the following specific description is read in connection with the accompanying drawing, in which:

Fig. 1 is a plan view of the invention, showing a pair of selected guide-bearing bushings applied to the ends of the body thereof; Fig. 2 is a similar view in front elevation; Fig. 3 is a large-scale transverse section on line 3—3 of Fig. 1; Fig. 4 is a large-scale end view showing a guide-bearing bushing of large diameter bore at that end of the cutter body; Fig. 5 is a similar view of the opposite end of the tool, showing a guide-bearing bushing with a bore of smaller diameter applied thereto; and Fig. 6 is a partially exploded longitudinal section of the tool, on the same scale as Figs. 1 and 2, showing the manual operation of applying a guide-bearing bushing to one end of the body.

Fig. 7 is a plan view, on a greatly reduced scale, of the cutter tool with a complete set of six guide-bearing bushings arranged for packaging in a box of minimum size, the latter being represented by broken lines.

Referring now in detail to the drawing, wherein like reference characters designate corresponding parts in the several views, it will be observed that the improved pocket-size cutter includes an elongated body 10, which preferably is cylindrical in form and has end sockets 11 and 12, respectively, of circular cross-section and uniform diameter concentric with its longitudinal axis for interchangeable reception of the reduced plug portions 13 of guide-bearing bushings 14 and 15, that constitute part of a set of bushings to accommodate the arrow shafts of standard diametrical sizes. The outer manipulating portions of bushings 14 and 15, as well as all others of the set, preferably are equal in outside diameter to body 10 in order to present flush peripheral faces when the bushings are in assembled positions on the body. Due to this flush peripheral relation, when either end of the tool is grasped in the hand for operational use, the body and corresponding guide-bearing bushing will both be included in the grasp and there will be no tendency to rotate the bushing without doing the same to the body of the tool, which latter is the element bearing the cutting blade and which requires rotation to be operative. The guide-bearing bushings, such as those shown in Figs. 1 to 6 and designated by the numerals 14 and 15, are provided with concentric cylindrical bearing bores 16 of varying inside diameters depending upon the diametrical sizes of the standard arrow shafts to be introduced therein for performance of the taper-cutting function of the tool, which may be accomplished by relative rotation and longitudinal translation of the body 10 and fitted bushing as a unit and the narrow shaft.

Inwardly of the respective end sockets 11 and 12 in body 10, differently tapered recesses or throats 17 and 18 are provided. These throats 17 and 18 are of substantially the same mean diameter and are tapered axially away from sockets 11 and 12 toward the geometrical center of body 10 and communicate with lateral shavings discharge openings 19 and 20, respectively, provided in the peripheral portion of body 10. Fixedly mounted in discharge openings 19 and 20 at appropriate angles to the rotational axis of body 10 are cutting blades 21 and 22, which may be secured removably in operative positions by suitable means, such as clamping screws 23 and 24, respectively. Each cutting blade is coextensive with the corresponding throat and has its cutting edge longitudinally parallel to the throat periphery.

It will be observed, upon reference to Figs. 3 to 6, that each throat 17 or 18 is in the form of a frustum of a cone and presents a perpendicular stop abutment 25 at its inner, closed end, which abutment defines the cut off top of the cone. When the end of an arrow shaft being taper-cut comes into contact with the stop abutment 25 of the throat in which engaged, further progress will be stopped so that taper cutting cannot reduce the shaft end to a sharp point and then continue indefinitely with consequent shorting of the shaft, as happens to a pencil in use of a conventional pencil sharpener. This is important, because it is always desirable to maintain the standard length of any arrow shaft when the ends are taper-cut. Moreover, the tapered end portion of an arrow shaft produced by the cutting operation will be in the form of a perfect frustum of a cone and thereby adapted to fit snugly throughout the length of its taper in the socket of an arrow or arrow nock, as the case may be.

Upon further reference to Fig. 6, it will be observed also that the end sockets 11 and 12 of body 10 and the mated plug portions 13 of both guide-bearing bushings 14 and 15 are of equal inside and outside diameters, respectively, which is true of the plugs of all the other guide-bearing bushings in the set. This is to permit the respective guide-bearing bushings of the set to be fitted interchangeably on either end of body 10 so that an arrow shaft of a diametrical size corresponding to that of the bore of a selected guide-bearing bushing may have a taper cut of appropriate angle applied to its foot end and nock end in succession by simply using the same guide-bearing bushing at one end of body 10 and then at the opposite end.

Since there are arrow shafts of six standard diametrical sizes in common use at the present time, I have provided the six guide-bearing bushings shown in Fig. 7 as comprising a complete set. The bores of these six bushings are graduated in diameter to accommodate the six standard arrow shafts, but their plug portions 13 are all of the same outside diameter to fit interchangeably in the socket 11 or 12 at either end of cutter body 10. When two of the bushings are assembled with the body and the other four are arranged alongside, all can be fitted in a small box 26, which preferably is made of plastic material.

It now should be apparent that I have provided a small, compact pocket tool of universal adaptation to the cutting of appropriately tapered ends on arrow shafts of the different currently standard diametrical sizes. This little tool fits the hand easily and can be carried in the archer's pocket or kit bag, either in the arrangement shown in Figs. 1 and 2 wherein two selected guide-bearing bushings are assembled with the tool body, or as part of the packaged set depicted in Fig. 7. Moreover, due to the simplicity of construction, all component parts of the set with the exception of the cutting blades and clamping screws may be molded from plastic material, which makes it practicable to produce the complete device in different attractive colors. When a colored tool body and a matching set of guide-bearing bushings are packaged in a transparent plastic box, the effect is very desirable in connection with merchandising.

It will be understood that it is intended to cover all changes and modifications of the example of the invention herein chosen for the purpose of illustration which do not constitute departures from the spirit of the invention and scope of the appended claim.

I claim:

A hand-operated end-taper cutter for arrow shafts comprising: a body having an inwardly tapered shaft-engaging throat and a shavings discharge opening extending laterally from said throat through the external surface of said body, said throat being in the form of a frustum of a cone with its cut off top face of the cone presenting a perpendicular stop abutment face for limiting contact with the end of an arrow shaft operatively engaged within said throat to prevent shortening of the shaft and a cutting blade set in the shavings discharge opening in operative relation to the shaft-engaging throat coextensive therewith and with its cutting edge completely straight and longitudinally parallel to the peripheral face of said throat, said throat being tapered at the same angle throughout its length and merging at its inner end with the stop abutment.

References Cited in the file of this patent

UNITED STATES PATENTS

| | | |
|---|---|---|
| 449,812 | Boyd | Apr. 7, 1891 |
| 585,670 | Graves | July 6, 1897 |
| 1,207,810 | Stevens | Dec. 12, 1916 |
| 1,433,320 | Wersel | Oct. 24, 1922 |